US012786074B2

(12) United States Patent
Trivedi et al.

(10) Patent No.: US 12,786,074 B2
(45) Date of Patent: Nov. 3, 2026

(54) ARTIFICIAL INTELLIGENCE-DRIVEN TRAFFIC ANALYSIS AND ANOMALY DETECTION FOR TELECOMMUNICATION NETWORKS AND INTERNET OF THINGS DEVICES

(71) Applicant: AT&T Intellectual Property I, L.P., Atlanta, GA (US)

(72) Inventors: Amee Trivedi, Amherst, MA (US); Yaron Koral, Cherry Hill, NJ (US); Jingwen Shi, East Lansing, MI (US); Hasit Dani, Hillsborough, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 24 days.

(21) Appl. No.: 18/901,051

(22) Filed: Sep. 30, 2024

(65) Prior Publication Data

US 2026/0095385 A1 Apr. 2, 2026

(51) Int. Cl.

*G06F 15/16* (2006.01)
*G06F 9/54* (2006.01)

(Continued)

(52) U.S. Cl.

CPC .......... *H04L 41/16* (2013.01); *H04L 43/0817* (2013.01); *H04L 47/2475* (2013.01); *H04L 63/1425* (2013.01)

(58) Field of Classification Search

CPC . H04L 41/16; H04L 43/0817; H04L 47/2475; H04L 63/1425

(Continued)

(56) References Cited

U.S. PATENT DOCUMENTS 9,654,503 B1 * 5/2017 Kowalyshyn ....... H04L 63/1425
11,388,042 B2 * 7/2022 Vasseur .................. H04L 41/40

(Continued)

FOREIGN PATENT DOCUMENTS

CN 110690995 A * 1/2020 ........... H04L 41/142
CN 117892011 A * 4/2024 ............ G06F 18/27

(Continued)

*Primary Examiner* — Hamza N Algibhah

(74) *Attorney, Agent, or Firm* — Guntin & Gust, PLC; Daniel P. Williams

(57) ABSTRACT

Aspects of the subject disclosure may include, for example, receiving application traffic from a plurality of Internet of Things (IoT) devices processing an application, including receiving the application traffic over a mobile communication network, clustering the application traffic to identify clusters of similar IoT devices based on common characteristics of the application traffic, receiving unknown traffic over the mobile communication network, determining a closest cluster based on similarities between the unknown traffic and respective clusters of the clusters of IoT devices, decomposing traffic signals of the closest cluster into trend, period, and noise information, forming decomposed traffic, reconstructing the decomposed traffic into reconstructed traffic based on the trend information and the period information to remove noise information from the traffic signals of the closest cluster, forming a baseline for the closest cluster, detecting an anomaly in the reconstructed traffic based on a variation in data of the reconstructed traffic from data of the baseline for the closest cluster exceeding a statistical threshold and initiating a corrective action to limit a security threat based on the anomaly in the reconstructed traffic. Other embodiments are disclosed.

20 Claims, 10 Drawing Sheets

270

(51) Int. Cl.

| | |
|---|---|
| ***H04L 9/40*** | (2022.01) |
| ***H04L 29/06*** | (2006.01) |
| ***H04L 41/16*** | (2022.01) |
| ***H04L 43/0817*** | (2022.01) |
| ***H04L 47/2475*** | (2022.01) |

(58) Field of Classification Search
USPC .......................................................... 709/224
See application file for complete search history.

(56) References Cited

U.S. PATENT DOCUMENTS

| | | | | |
|---|---|---|---|---|
| 12,079,233 | B1 * | 9/2024 | Mishra | G06F 16/2465 |
| 12,088,453 | B2 * | 9/2024 | Safavi | H04L 41/0654 |
| 12,316,518 | B2 * | 5/2025 | Shemer | H04L 41/0627 |
| 2012/0131674 | A1 * | 5/2012 | Wittenschlaeger | G06F 21/552 726/23 |
| 2015/0199224 | A1 * | 7/2015 | Mihnev | G06F 11/0709 714/37 |
| 2019/0384255 | A1 * | 12/2019 | Krishnaswamy | G05B 23/024 |
| 2020/0084087 | A1 * | 3/2020 | Sharma | H04W 24/08 |
| 2020/0220875 | A1 * | 7/2020 | Harguindeguy | H04L 63/101 |
| 2022/0035806 | A1 * | 2/2022 | Horesh | G06F 16/2462 |
| 2023/0231852 | A1 * | 7/2023 | Harguindeguy | H04L 63/101 726/26 |
| 2024/0019282 | A1 * | 1/2024 | Shoener | G01D 3/032 |
| 2024/0320486 | A1 * | 9/2024 | Li | G06N 3/08 |
| 2024/0362666 | A1 * | 10/2024 | Hobbs | G06Q 40/06 |
| 2025/0007924 | A1 * | 1/2025 | Li | H04L 63/1425 |
| 2025/0028309 | A1 * | 1/2025 | Shi | G05B 23/0235 |
| 2025/0119834 | A1 * | 4/2025 | Chen | H04W 52/0229 |
| 2025/0254090 | A1 * | 8/2025 | Descombes | H04L 41/0833 |
| 2025/0337762 | A1 * | 10/2025 | Keisar | H04L 63/1408 |
| 2026/0039596 | A1 * | 2/2026 | Gabbur | H04L 43/0876 |
| 2026/0046215 | A1 * | 2/2026 | Rodriguez, Jr. | H04L 41/145 |

FOREIGN PATENT DOCUMENTS

| | | | | |
|---|---|---|---|---|
| EP | 3876476 A1 * | 9/2021 | | G06N 7/01 |
| EP | 4214898 B1 * | 4/2024 | | H04L 63/1425 |
| EP | 4679795 A1 * | 1/2026 | | H04L 63/0428 |
| WO | WO-2018160177 A1 * | 9/2018 | | H04L 41/142 |

* cited by examiner

100

200

220

230

250

300

600

ARTIFICIAL INTELLIGENCE-DRIVEN TRAFFIC ANALYSIS AND ANOMALY DETECTION FOR TELECOMMUNICATION NETWORKS AND INTERNET OF THINGS DEVICES

FIELD OF THE DISCLOSURE

The subject disclosure relates to system and method for telecommunication networks and Internet of Things devices.

BACKGROUND

Devices such as Internet of Things (IoT) devices operate in a service area providing services for a remotely located service provider. The IoT devices may communicate with the service provider over a cellular network or other telecommunication networks. An example is a connected vehicle which collects and forwards telematics data to a manufacturer of the vehicle over a cellular network operated by a network operator.

When such a device links to a base station of a cellular network, the base station forwards the traffic to a core network of the network operator. The network operator then monitors this traffic at a gateway of the core network before sending it to the service provider.

BRIEF DESCRIPTION OF THE DRAWINGS

Reference will now be made to the accompanying drawings, which are not necessarily drawn to scale, and wherein.

DETAILED DESCRIPTION

Figure 1:
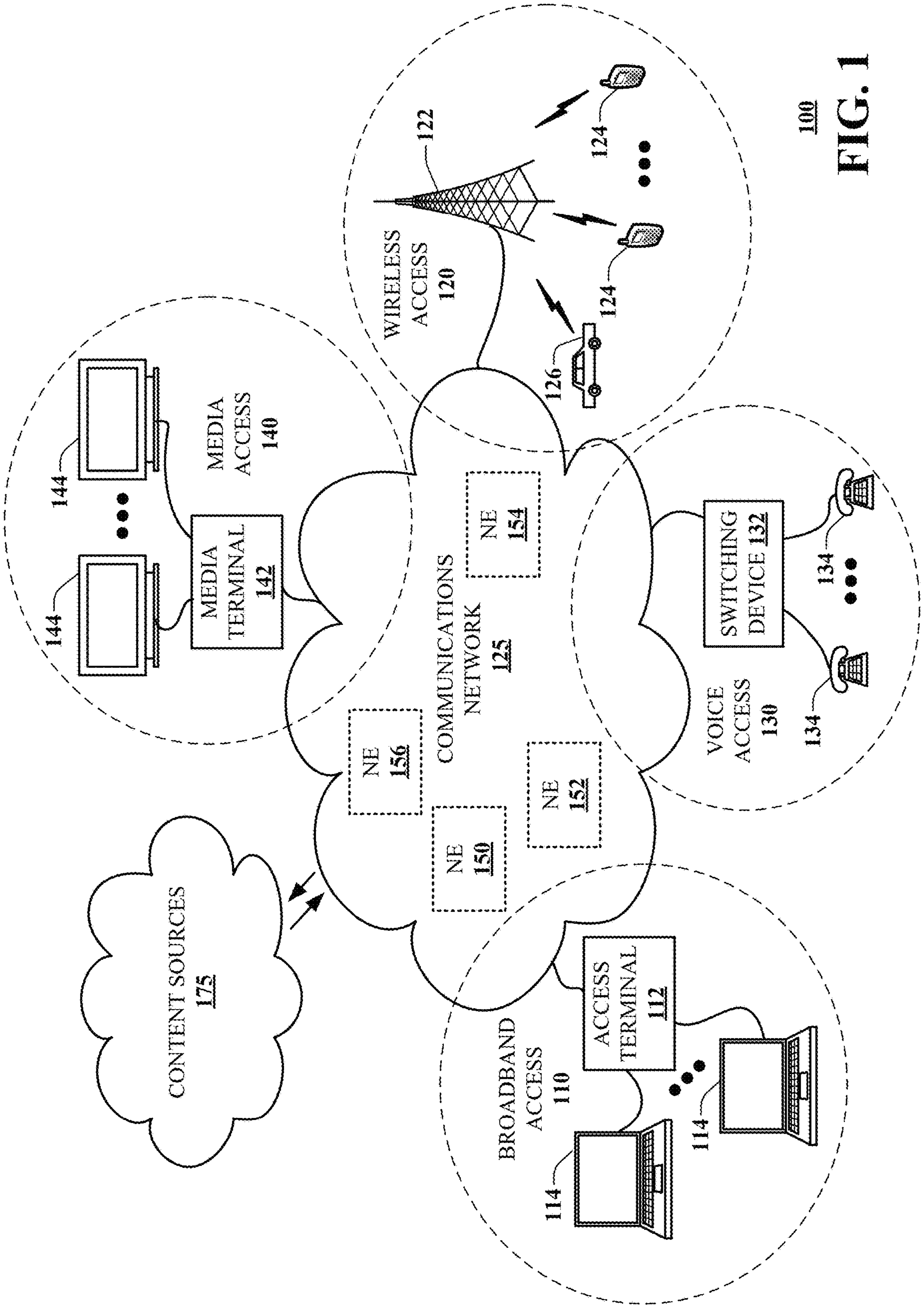
FIG. 1 is a block diagram illustrating an exemplary, non-limiting embodiment of a communications network in accordance with various aspects described herein.

The subject disclosure describes, among other things, illustrative embodiments for detecting anomalies in telecommunication networks including IoT devices to maintain network reliability, data privacy, system reliability, compliance with regulations, and to protect against fraudulent activities. Other embodiments are described in the subject disclosure.

One or more aspects of the subject disclosure include receiving communication traffic from one or more Internet of Things (IoT) devices, the communication traffic comprising time series data, clustering the communication traffic, wherein the clustering comprises identifying an assigned cluster to which the communication traffic should be assigned and determining a similarity between the communication traffic and the assigned cluster, and decomposing time series data of the communication traffic within the assigned cluster, forming decomposed time series. Aspects of the subject disclosure further include determining a baseline of the assigned cluster after removing noise from the decomposed time series, forming a reconstructed traffic signal, detecting an anomaly in the reconstructed traffic signal, wherein the detecting the anomaly is based on a variation of a data flow value of an anomalous IoT device from the baseline of the assigned cluster, and identifying the anomalous IoT device.

One or more aspects of the subject disclosure include receiving unknown communication traffic in a radio communication network, identifying a closest cluster among a plurality of clusters, the plurality of clusters corresponding to traffic patterns in the radio communication network, wherein traffic patterns in a respective cluster share common traffic characteristics, the closest cluster having a smallest spatial distance from the unknown communication traffic, and adding the unknown communication traffic to the closest cluster. Aspects of the subject disclosure further include decomposing all communication traffic in the closest cluster, forming a decomposed time series, removing noise from the decomposed time series, reconstructing a baseline of the closest cluster based on trend information and period information of the decomposed time series, forming a reconstructed cluster, comparing values of the unknown communication traffic with a range of values for the reconstructed cluster to identify an anomaly in the unknown communication traffic, and identifying a device or an application operating on the device associated with the anomaly.

One or more aspects of the subject disclosure include receiving application traffic from a plurality of Internet of Things (IoT) devices processing an application, wherein the receiving the application traffic comprises receiving the application traffic over a mobile communication network, clustering the application traffic to identify clusters of similar IoT devices based on common characteristics of the application traffic from the plurality of IoT devices, receiving unknown traffic over the mobile communication network, and determining a closest cluster, the closest cluster being determined based on similarities between the unknown traffic and respective clusters of the clusters of IoT devices. Aspects of the subject disclosure further include decomposing traffic signals of the closest cluster into trend information, period information and noise information, forming decomposed traffic, reconstructing the decomposed traffic into reconstructed traffic, wherein the reconstructing is based on the trend information and the period information to remove noise information from the traffic signals of the closest cluster, forming a baseline for the closest cluster, detecting an anomaly in the reconstructed traffic, wherein the detecting the anomaly is based on a variation in data of the reconstructed traffic from data of the baseline for the closest cluster exceeding a statistical threshold and initiating a corrective action to limit a security threat, wherein the corrective action is based on the anomaly in the reconstructed traffic.

Referring now to FIG. 1, a block diagram is shown illustrating an example, non-limiting embodiment of a system 100 in accordance with various aspects described herein. For example, system 100 can facilitate in whole or in part receiving data over a network from devices operating in the network, clustering the data for classifying further data, receiving unknown data and comparing the unknown data with data clusters to identify data anomalies, and taking corrective action based on the data anomalies to prevent security breaches in the network. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
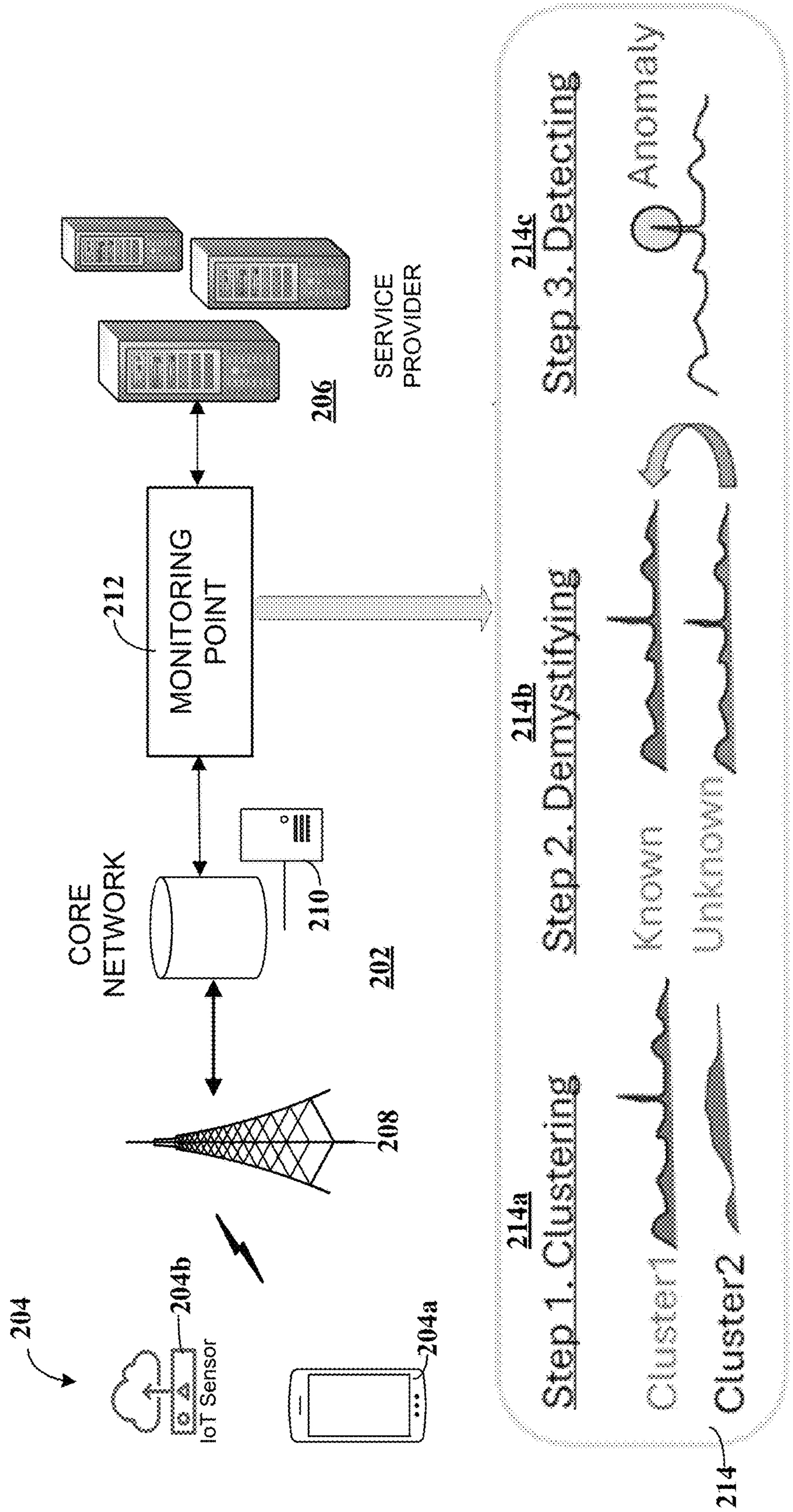
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. The system 200 includes a cellular network 202 communicating with user equipment (UE) 204 and with equipment of a service provider 206. In some embodiments, the system 200 may be implemented in part by the wireless access 120 of FIG. 1.

The cellular network 202 may implement a telecommunications system according to a defined standard such as fourth generation cellular (4G or LTE), fifth generation cellular (5G) or any similar or follow-on standard. The cellular network 202 in this example includes one or more base stations such as base station 208, a core network 210 and a gateway 212. The base stations 208 include, for example, an eNodeB or gNodeB or combination of these for providing radio communications with one or more UE 204 in a service area of the base station. The UE 204 may include devices such as smartphone 204*a* and IoT device 204*b*. The core network 210 is in data communication with the base stations including base station 208 for providing various command and control functions for the network operator and for the UE 204. Such command-and-control functions may include an authentication and authorization function, mobility management, and others. The gateway 212 enables communication between the cellular network 202 or core network 210 and external networks such as the public internet. In the illustrated example, the cellular network 202 communicates with service provider 206 through the gateway 212.

Devices such as IoT device 204*b* operate in a service area providing services for a remotely located service provider such as service provider 206. The IoT devices may communicate with the service provider 206 over the cellular network 202 or other telecommunication networks. An example is an IoT device of a connected vehicle collects and forwards telematics data to a manufacturer of the vehicle over a cellular network operated by a network operator. The network operator may designate an access point name (APN) in the cellular network that is to be associated with all traffic for a particular service provider such as the manufacturer of the vehicle. The APN functions as a gateway to connect the IoT devices to the service provider.

When such a device links to a base station of a cellular network such as cellular network 202, a base station such as the base station 208 forwards the traffic to a core network such as the core network 210 of the network operator. The network operator then monitors this traffic at a gateway such as the gateway 212 of the core network before sending it to the service provider 206. In examples, the traffic is in the form of packets, each packet including a header with addressing information and a payload. In many instances, only the destination network address is visible, without an associated application name. Such unidentified traffic can sometimes be generated by applications using private IP addresses, which can pose notable security risks. Such unknown traffic thus has only limited identification information and is potentially malicious. Such unknown traffic may pose a security threat to the cellular network 202 or to the service provider 206.

A first security risk involves security of IoT devices themselves. Customers of the network operator, or service providers, often express confusion upon encountering this unknown traffic and frequently inquire whether the customer devices have been attacked. This uncertainty can lead to a lack of trust in IoT devices, highlighting the critical need for robust traffic monitoring and identification systems to ensure customer confidence and device security.

A second security risk involves the security of service providers such as the service provider 206. Service providers face significant challenges in determining whether this unknown traffic is abnormal and whether the associated IP addresses should be added to an allowed list or deny list. The inability to accurately classify this traffic can result in potential security breaches or denial of service, making it imperative for service providers to have advanced tools and methodologies to identify and mitigate these risks effectively.

A third security risk involves network management for network operators. The presence of unknown traffic complicates the detection of anomalies within the network for mobile network operators. Effective network management is crucial for maintaining service quality and reliability. Therefore, developing sophisticated mechanisms to identify and manage unknown traffic is essential for ensuring the seamless operation of mobile networks and safeguarding against potential threats.

With IoT devices associated with a service provider, generally the applications that may be running on the IoT device and providing data to the cellular network for the service provider are known ahead of time. The applications are selected from a limited set for performing particular functions by the IoT device. For example, for a connected vehicle, the traffic from the IoT device includes telematics and performance data, infotainment data for specific, known infotainment applications. In another example, the IoT device may be associated with a body worn camera of a first responder or of a roadside-mounted traffic camera. The traffic from such IoT devices may be largely limited to streaming video data.

It may happen that an IoT device or other device accessing the cellular network 202 may be infected by malware or other improper software. The network traffic from the IoT device may, as a result, include anomalous information, such as video going to an unknown destination, or data associated with an unknown domain name server (DNS) user. Such traffic may indicate an unauthorized user or improper use of the IoT device or the network.

The network operator may therefore attempt to identify what is normal traffic in the network, and what is noise. Some traffic may be anomalous and unaccounted for. Then, patterns or similarities in the unaccounted traffic may be identified, such as traffic from geographical locations or traffic from certain types of devices. In essence, demystifying and detecting anomalies in unknown traffic is not just about protecting individual devices but also safeguarding the broader ecosystem of interconnected technology. The potential for harm in these interconnected environments underscores the critical need for proactive detection and response to malware. This approach is essential for maintaining safety, privacy, functionality, and trust across the entire network.

Traditional methods for identifying unknown traffic often rely on manually labeling IP addresses used by such traffic. Service providers typically scrutinize traffic content and create an allowed list of safe IP addresses. However, this approach is subject to error and frequently misses many IP addresses and cannot be updated quickly, especially since there are often over 10,000 unknown IP addresses associated with an APN.

Another common method uses port numbers to differentiate services, such as domain name system (DNS) typically using port 443 for hypertext transfer protocol-secure (HTTPS) data. A DNS port is a specific numerical address within a network that is used to identify a particular service or application. However, some service providers and other users employ custom ports, leading to numerous exceptions. Existing machine learning methods use supervised learning to predict traffic classes, which requires a large amount of labeled traffic and can only classify traffic seen during the training phase.

Another method for classifying traffic is the use of machine learning algorithms for mapping traffic to particular algorithms. This has been of limited value because such a machine learning model can only classify what it has been trained to identify. Training requires substantial data which may not be available. Moreover, new IoT devices are frequently introduced, and an algorithm must be trained on data associated with that device before the model can be reliably used. Again, substantial amounts of training data are required for training.

Current traffic anomaly detection methods focus on identifying anomalies in individual traffic flows. An example is Prophet, which is an open-source time series forecasting tool that can also be used for anomaly detection. This approach is sensitive due to the limited information available and often fails to account for the complexities of real-world scenarios, resulting in frequent false alarms.

To address the noted challenges and others, a system and method in accordance with various aspects described herein enable identifying unknown traffic and performing more accurate anomaly detection. FIG. 2A illustrates aspects of a system 214 for anomaly detection. The system 214 receives traffic information from the gateway 212 or other monitoring point. First, traffic clustering 214*a* is employed. Traffic may be represented as a time series of statistics, such as downlink and uplink volumes. These traffic patterns can be clustered based on their characteristics. For example, some may exhibit daily or weekly patterns, while others may be flat or sharp. For newly arrived and unknown IP traffic, they can be associated with the clusters that show the most similar patterns.

The system 214 further includes a process of demystifying 214*b*. Known traffic in the clustered data is identified. The known traffic may be associated with and identified with a particular type of IoT device, a particular location or a particular application, for example. Known traffic may be dismissed without further processing or given reduced processing.

Further, cluster-based anomaly detection 214*c* is performed. This method is efficient because the same model and parameters can be used for all IP traffic and applications, rather than requiring a specific model for each one.

This approach enhances accuracy by clustering traffic patterns, reducing false positives, and improving anomaly detection. It is scalable, capable of efficiently handling large data volumes, and enables proactive threat detection by associating new traffic with existing clusters. The method provides contextual analysis, optimizes resource use, and adapts to evolving traffic patterns, ensuring robust and dynamic network security.

Figure 2B:
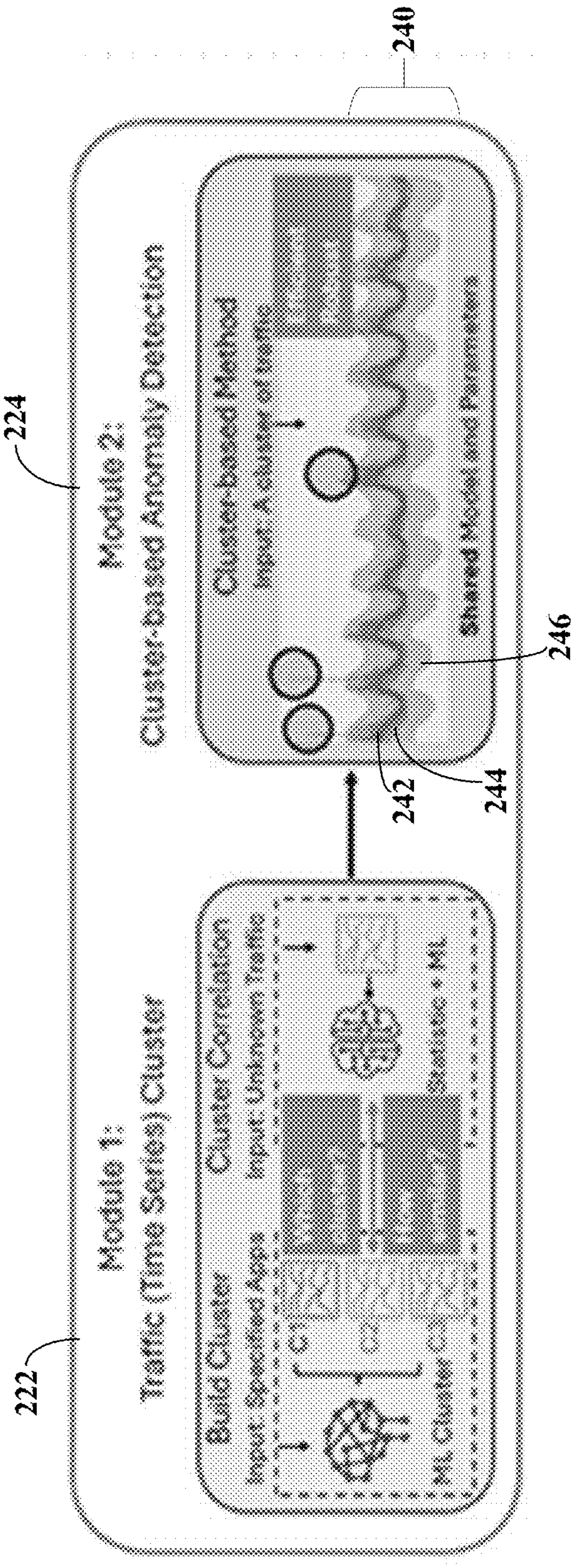
FIG. 2B is a block diagram illustrating an example, non-limiting embodiment of a system in accordance with various aspects described herein.

FIG. 2B is a block diagram illustrating an example, non-limiting embodiment of a system 220 in accordance with various aspects described herein. The system 220 in the exemplary embodiment includes a traffic clustering module 222 and an anomaly detection module 224. In some embodiments, the system 220 may be implemented in software, hardware or any suitable combination of these. Further, the system 220 may be implemented at any suitable location in a network operated by the network operator, such as in the core network 210 of the cellular network 202 (FIG. 2A).

The traffic clustering module 222 leverages machine learning models to identify all significant clusters in traffic from one or more IoT devices communicated over a network such as the cellular network 202. The traffic clustering module 222 addresses two questions when correlating unknown traffic. First, the traffic clustering module 222 identifies which cluster the traffic should belong to and, second, the traffic clustering module 222 considers how similar the traffic is to the identified cluster. The anomaly detection module 224 calculates a central baseline and an upper boundary and a lower boundary of each cluster for anomaly detection using signal decomposition and statistical methods.

Figure 2C:
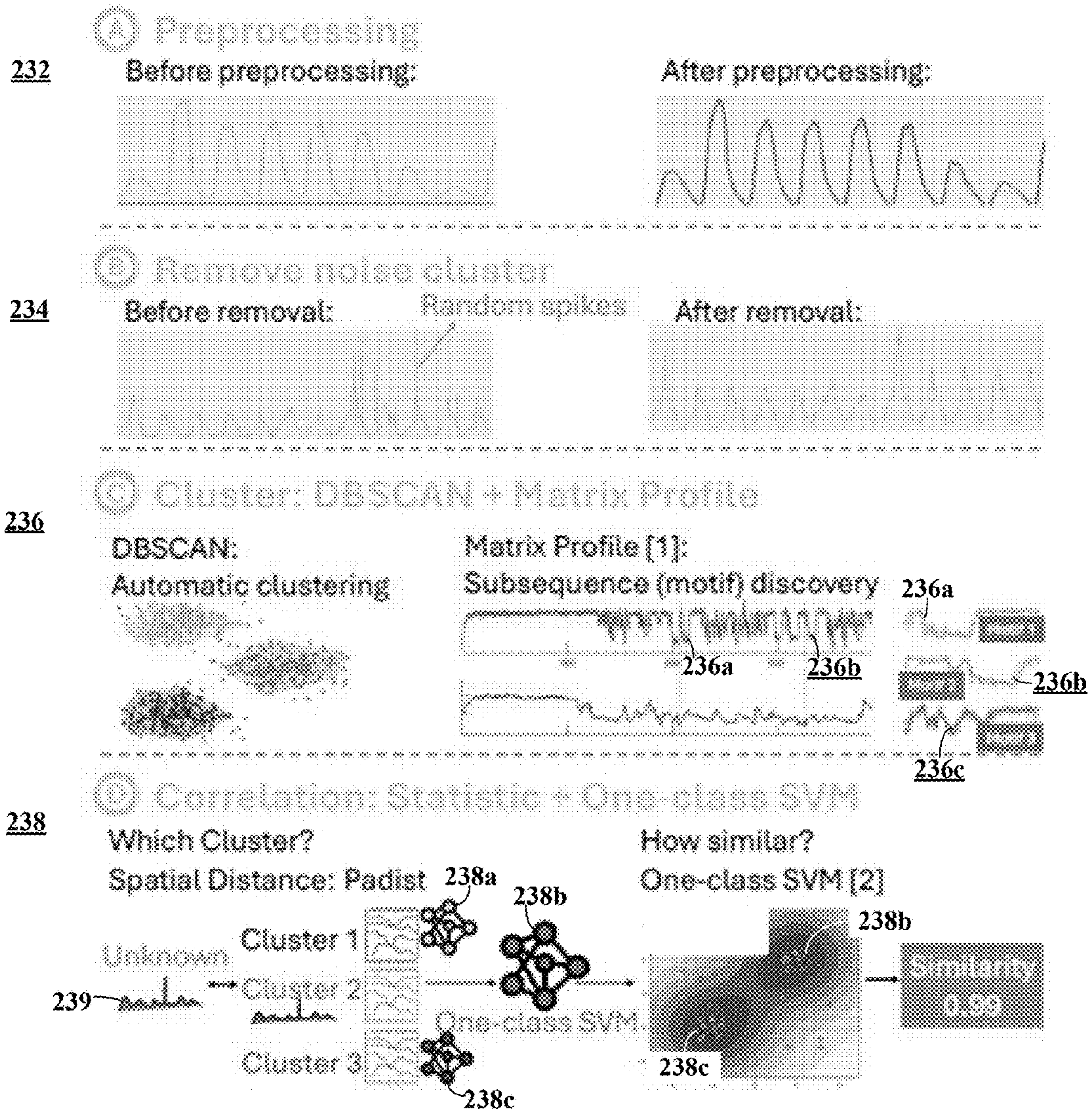
FIG. 2C is a block diagram illustrating an example, non-limiting embodiment of a traffic clustering process in accordance with various aspects described herein.

FIG. 2C is a block diagram illustrating an example, non-limiting embodiment of a traffic clustering process 230 in accordance with various aspects described herein. The operations of the traffic clustering process 230 may be performed by or in conjunction with the traffic clustering module 222 of FIG. 2B. Thus, the operations of the traffic clustering process 230 may be performed at any suitable location, such as at a server of the core network 210 of FIG. 2A, at a cloud location operated by the network operator, or any other network-accessible location.

The traffic clustering process 230 may receive information about communication traffic in a telecommunications network such as cellular network 202. In particular, the gateway 212 may operate to detect IoT traffic associated with one or more service providers such as service provider 206 and directed to an APN dedicated to that service provider or customer. The service provider defines what applications the IoT device may use.

The traffic data may be organized as time series data, with each packet or other data segment having an associated timestamp and a data value. The gateway 212 may process or reroute such traffic to the system 214 for anomaly detection, FIG. 2A. For example, the gateway 212 or other processes may examine the five-tuple, or the five parameters that uniquely identify a TCP/IP connection. These five parameters are a source IP address of the sending device, or the IoT device in this example; the source port, or the port number used by the sending application on the source IP address; the destination IP address, or the IP address of the receiving device or the service provider 206 in this example; the destination port, or the port number used by the receiving application on the destination IP address; and the protocol, or the transport layer protocol used for the connection, such as TCP, UDP, etc. The volume of data packets may be tracked, as well. Generally, processing traffic flows does not use payload information of the packets, consistent with maintaining customer and user privacy. In the exemplary embodiment, the traffic clustering process 230 includes a preprocessing process 232, a noise removal process 234, a clustering process 236 and a correlation process 238. Other embodiments may include additional or alternative processes or operations.

The preprocessing process 232 may operate to clean, balance and normalize raw traffic data from IoT devices. For example, the preprocessing process 232 may detect data with missing fields (such as missing five-tuple data) or data that is out of range. Missing variables may be filled in or out-of-range data may be excluded.

Traffic flows are often highly unbalanced, even within the same cluster. Some flows may involve data from 10,000 IoT devices, while other flows may only include hundreds or even dozens of IoT devices. During the preprocessing process 232, normalization scales all flows to similar levels, facilitating better observation of traffic patterns and comparison among traffic patterns.

A noise removal process 234 operates to remove noisy data from received traffic data. Certain traffic flows display random spikes instead of clear patterns. Such spikes or noise are typically caused by relatively few devices. Thus, the spikes appear to have a relatively high amplitude but little volume in the traffic data. Such noise spikes provide limited information. The noise removal process 234 operates to identify such flows and group such flows into a noise cluster to prevent their misclassification into meaningful clusters. Removing these noise clusters results in cleaner data for the traffic clustering process 230. As illustrated in FIG. 2C, relatively random spikes of noise may be detected and removed. Any suitable noise detection scheme or apparatus may be used. Following the noise removal process 234, the data is clean.

The cleaned data is in the form of time series data for each IoT device. Referring again to FIG. 2B, the anomaly detection module 224 illustrates generally the format of the data processed by the system 220. A data flow 240 is arranged along an abscissa or time axis and along an ordinate or y-axis. The time axis corresponds to timestamps of the data, such as temporal information retrieved from packet headers. The ordinate information is a measure of an amount of data included in the data flow 240. The ordinate corresponds to a data flow packet unit. This may be measured in units of kilobytes or megabytes, etc., based on what kind of IoT device forms the source of the data. In the data flow 240, the data is averaged out for a number of IoT devices for a particular customer or service provider. Within the plot of the data flow 240, a median central line 242 corresponds to a median of the data for a group of devices. The jitter 244 around the median central line 242 corresponds to a range of data for individual single devices of the group of devices. The envelope 246 illustrates the range for a set of devices.

Thus, the noted portion of FIG. 2B illustrates collected data for a set of IoT devices and for those specific time stamps on the same day, at the same time. The envelope 246 illustrates the entire range for the devices for that time stamp value.

The clustering process 236 operates to process the IoT traffic data and clusters the data based on common characteristics. In embodiments, a routine such as Density-based spatial clustering of applications with noise (DBSCAN) may be used for the clustering process 236. DBSCAN evaluates both spatial data and temporal data. In the example, the DBSCAN algorithm evaluates data at the same time stamp for all devices, including the shapes of the data and determines which of the data flows look similar. For example, an IoT device used at 3:00 AM would generate data having a similar shape to the data from a similar IoT device at 5:00 AM, but the data are time-shifted. DBSCAN can identify the matching shapes and, based on the match, cluster the data and the IoT devices together.

DBSCAN groups data points based on the density of the points. This means points that are close together and have many nearby neighbors are likely to be part of the same cluster. DBSCAN operates on data points in a spatial or geometric space, considering their location and distance from each other. DBSCAN is adapted to handling noise in the data. Noise includes data points that do not belong to any cluster. DBSCAN can identify and isolate these outliers. Further, DBSCAN is an automatic machine learning clustering algorithm that does not require manual configuration of the number of clusters in the dataset, enhancing its efficiency.

However, DBSCAN is not inherently designed for time series data with temporal structures. To address this limitation, the Matrix Profile method, a statistical approach for time series data, is used to discover subsequences and represent the original time series. The Matrix Profile method is a technique used in time series analysis to measure similarity between different time series. It provides a compact representation of the similarity between a query time series and all other time series in a dataset, enabling efficient similarity search and anomaly detection. The Matrix Profile can be used to efficiently find the most similar time series to a given query time series. In essence, Matrix Profile is employed for feature extraction and a new distance measure, which are then input into the DBSCAN algorithm.

As illustrated in FIG. 2C, the Matrix Profile method can be used to discover motifs in time series data. A motif is a pattern or a subsequence in the data. In FIG. 2C, three motifs have been identified including a first motif 236*a*, a second motif 236*b* and a third motif 236*c*. A motif is a recurring pattern or subsequence that appears multiple times within a time series. The Matrix Profile stores the minimum Euclidean distance between a subsequence of a query time series and all subsequences of the same length in a dataset. By identifying subsequences with low Matrix Profile values, the algorithm can discover motifs that are similar to the query subsequence. For example, there may exist spikes in the data that correspond to downloads of software updates to the IoT devices, or for other reasons. Those spikes can be identified using motifs.

To discover motifs, the Matrix Profile may initially choose or be programmed with a length of the subsequence of interest. The process then includes calculating the Matrix Profile for the dataset and the query subsequence. The process then identifies subsequences in the dataset with low Matrix Profile values. Such values indicate similarity to the query subsequence. These subsequences are potential motifs. The process can then further analyze the identified subsequences to determine if they are indeed motifs. This can involve considering factors such as frequency of occurrence and statistical significance. Any other suitable method may be used for clustering the traffic data.

In examples, the traffic clustering process 230 is operated to detect security issues for a service provider such as service provider 206. The security issues may be manifested as anomalous data associated with one or a group of IoT devices. Identifying motifs such as the first motif 236*a*, the second motif 236*b* and the third motif 236*c* enables identifying such security issues in near-real time, such as within a few minutes or a few hours of the occurrence of the detected activity.

The correlation process 238 is performed on unknown traffic 239 using spatial distance to determine the closest cluster. The unknown traffic 239 may be any traffic communicated in the cellular network 202, including traffic originating at one or more IoT devices 204*b* associated with a service provider 206 (FIG. 2A). The unknown traffic 239 may come from existing IoT devices from which traffic has been previously processed. Or the unknown traffic may come from a new IoT device, either a new model or version or an entirely new device not seen before. A one-class support vector machine (SVM) then evaluates the similarity, estimating the boundaries of the clusters and providing a similarity score. A one-class support vector machine (SVM) is a machine learning algorithm used for anomaly detection. A one-class SVM focuses on identifying outliers or anomalies within a single class of data.

In embodiments, a one-class SVM constructs a hyperplane that separates the normal data points from the potential outliers. The one-class SVM algorithm aims to maximize the distance between the hyperplane and the nearest normal data points, creating a margin. Data points that fall outside this margin are considered outliers or anomalies. Further, in some embodiments, a Proximity-based Distance for Similarity and Trajectory (PaDIST) algorithm may be used to detect anomalies. More specifically, PaDIST may be used to identify unusual or abnormal trajectories that deviate significantly from the norm. PaDIST calculates the distance between two trajectories based on their spatial proximity and temporal proximity. This makes it particularly useful for tasks involving trajectory similarity, clustering, and classification.

FIG. 2C illustrates clustering. In the example, DBSCAN has processed data from 100 IoT devices and identified three clusters among the data, including a first cluster 238*a*, a second cluster 238*b* and a third cluster 238*c*. Each cluster, including first cluster 238*a*, second cluster 238*b* and third cluster 238*c*, corresponds to a set of IoT devices that exhibit a similar pattern. The set of IoT devices may be the same device or type of device and they are associated with the same service provider. Each of the IoT devices of the set of IoT devices may be operating under control of the same application, such as a data sensing application or a video camera application or a connected vehicle application.

FIG. 2C illustrates two of the three clusters on a common plot. The second cluster 238*b* is plotted separately from the third cluster 238*c*. The clusters, second cluster 238*b* and the third cluster 238*c*, each represents a set of IoT devices that show a similar pattern. Because of the distance between the centers of the two clusters, they are considered to be two clusters. For example, a threshold distance may be set and if the distance from the center of the third cluster 238*c* to the center of the second cluster 238*b* is greater than the threshold, they are treated as two separate clusters. On the other hand, the if the distance from the center of the third cluster 238*c* to the center of the second cluster 238*b* is less than the threshold, they are treated as a single cluster. Any suitable threshold value may be used for classifying and processing the data. Moreover, in some embodiments, a cluster can be defined to include two or more or many sub-clusters for further analysis.

The correlation process 238 enables identifying which correlation belongs to which specific data flow. For this process, the one-class SVM enables computation of a correlation between clusters, or determination of similarity between one cluster, such as first cluster 238*a*, and the second cluster 238*b*.

Referring again to FIG. 2B, the traffic clustering module 222 enables receiving IoT data, cleaning the data, analyzing the data and creating segments or fragments of the data for analysis and manipulation. The traffic clustering module 222 enables building clusters and correlating the clusters. The second module, the anomaly detection module 224, enables detection of anomalous data.

Figure 2D:
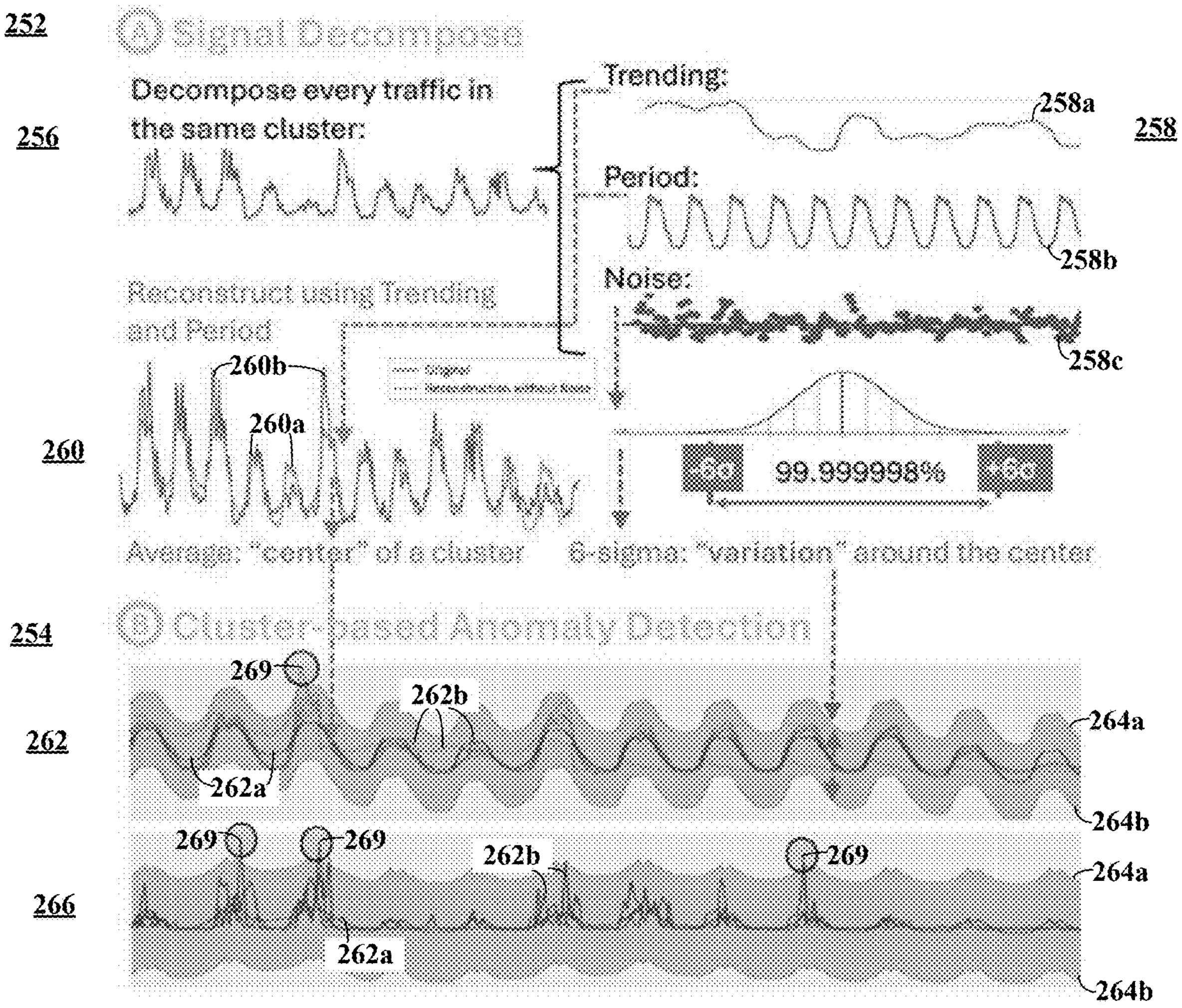
FIG. 2D is a block diagram illustrating an example, non-limiting embodiment of an anomaly detection process in accordance with various aspects described herein.

FIG. 2D is a block diagram illustrating an example, non-limiting embodiment of anomaly detection process 250 in accordance with various aspects described herein. The operations of the anomaly detection process 250 may be performed by or in conjunction with the anomaly detection module 224 of FIG. 2B. Thus, the operations of the anomaly detection process 250 may be performed at any suitable location, such as at a server of the core network 210 of FIG. 2A, at a cloud location operated by the network operator, or any other network-accessible location.

The anomaly detection process 250 includes a signal decomposition process 252 and a cluster-based anomaly detection process 254. The signal decomposition process 252 has as an input a plurality of time series such as a time series data 256. Such time series exist for each cluster identified by the traffic clustering module 222. Each cluster will have a set of data points. Each data point corresponds to an IoT device and has its own time series.

In the signal decomposition process 252, the entire time series data 256 is decomposed into three components 258. Any suitable technique may be used for decomposing the time series data 256. The three components 258 include a trend 258*a*, a period 258*b* and noise 258*c*. The period 258*b* corresponds to a time duration when the time series data is repeating, providing a temporal periodicity in data of the time series data 256. The trend 258*a* corresponds to either rising or falling values in the time series data 256, or identification of increasing time series data values or decreasing time series data values. The noise 258*c* corresponds to a randomness in the time series data 256. For example, the time series data 256 is related to each cluster and each cluster has a set of data points, each data point corresponding to an IoT device. Each IoT device operates independently, and they do not necessarily respond identically but respond randomly, to a degree. The noise 258*c* captures aspects of that randomness of the individual IoT devices. The signal decomposition process 252 operates to further remove noise from the time series data. The noise component follows a normal distribution, indicating that 99.99% of the variation should fall within six sigma, or six standard deviations. This allows for the calculation of the variation around the center, establishing the upper and lower boundaries around the central baseline.

In a reconstruction process 260, an original signal is reconstructed using the information of the trend 258*a* and the information of the period 258*b*. Any suitable technique may be used for reconstructing the original signal. In FIG. 2D, the original signal 260*a* is plotted with the combination original signal plus noise 260*b*.

The cluster-based anomaly detection process 254 seeks to identify anomalies in the cluster data. A cluster data plot 262 shows cluster data along a time axis. For example, all the time series may be averaged to determine the center or baseline of a cluster. The baseline alone does not indicate whether a data point is abnormal; the variation from the center or baseline must also be assessed. A baseline or center line 262*a* of the cluster data plot 262 may be determined. In an example, a cluster such as cluster 238*b* (FIG. 2C) may be selected and a centroid of the selected cluster 238*b* may be determined using statistical techniques. An IoT device which has data located closest to the centroid of the cluster may be selected as the baseline device for that cluster. In FIG. 2D, the center line 262*a* of the cluster data plot 262 corresponds to the selected cluster 238*b*. The data of the IoT device associated with the selected cluster 238*b* is plotted against a time axis in the cluster data plot 262, forming the center line 262*a*. In FIG. 2D, the reference to "the center" corresponds to the centroid of that cluster (FIG. 2C) which is the baseline data flow expected in that cluster.

Moreover, the cluster data plot 262 also shows other IoT device data plotted on the temporal axis. These cluster data lines 262*b* correspond to data flows of all the other IoT devices in the selected cluster 238*b*. Thus, the cluster data plot 262 shows data flow of the reconstructed trend and period of all the IoT devices in the selected cluster 238*b*. A second cluster data plot 266 shows data flow of the reconstructed trend and period of all the IoT devices in the cluster 238*c* in FIG. 2C.

FIG. 2D further shows definition of a six sigma ($\pm 6\sigma$) variation about the center line 262*a*. Any number n of standard deviations ($\sigma$) may be selected to define the range. Six standard deviations are shown in the example of FIG. 2D. The range in the cluster data plot 262 is defined by a maximum 264a and a minimum 264*b* defining an envelope around the center line 262*a*.

Any point, such as point 269, that extends outside the range is defined as an anomaly. Such points including point 269 correspond to reconstructed time series for a particular IoT device that have varied more than an acceptable value ($\pm 6\sigma$) from the time series for the device which has been determined to be the center device. Those points 269 are termed as anomalies because they have fallen outside of what denoised center of a cluster looks like within the range. The point 269 is not within that range, so it is by definition an anomaly.

When an anomaly is identified by the anomaly detection process 254, any suitable action may be taken. In one example, the network operator may receive from the anomaly detection process 250 an indication or an identification of the anomaly. The indication may include any suitable information, such as identification information for an IoT device responsible for the anomaly, a network address for the IoT device, or physical or geographical information locating the IoT device.

In one embodiment, the network operator provides to the service provider 206 accessing the gateway 212 (FIG. 2A) a dashboard that may be displayed on a user device of the service provider 206. The dashboard may display real-time data or near-real-time data about IoT devices of the service provider 206 operating on the cellular network 202, including IoT devices associated with one or more anomalies. The dashboard may display statistical information and other diagnostic information for use by the service provider 206.

In some examples, the network operator or the service provider may take action to quarantine or disable an IoT device associated with the detected anomaly. For example, the cellular network 202 or the core network 210 could be modified to detect traffic originating with the IoT device associated with the detected anomaly and either block further transmission of that traffic to another destination or redirect that traffic to a safe network destination for further investigation. A network component of the cellular network may perform deep packet inspection (DPI) quarantine to isolate and contain malicious or suspicious network traffic from the IoT device associated with the anomaly. DPI technology analyzes the contents of network packets, examining both the header information (source/destination IP addresses, ports, protocols) and the payload (actual data) and compares the packet's characteristics against a predefined set of rules or signatures associated with known threats. If a match is found, the packet is deemed suspicious or malicious. In another example, the IoT device associated with the detected anomaly may be disconnected from the network. The disconnection may be done in any suitable manner, such as blocking all addressing information associated with the affected device to prevent communication to or from the affected device.

The illustrated method and system are readily expandable and adaptable. For example, FIG. 2C shows correlation process 238 which, in the example, identifies three clusters among the data flows. If a new data flow is introduced, the clustering process 236 and the correlation process 238 will operate to identify a new cluster based on common characteristics in the new data flow. For example, if the service provider 206 introduces a new type of IoT device, the new IoT device will generate data that is unique relative to existing IoT devices. The data from the new IoT device may be clustered together to identify anomalies. The clustering process 236 will determine how similar is this new cluster to an existing cluster? If sufficiently similar, the two clusters may be merged into a single cluster. If not sufficiently similar, the new cluster may be treated as an independent cluster and processed similarly. For example, a trend and period may be identified in the cluster data and anomalies may be isolated and identified. Thus, unlike the machine learning solutions mentioned above, the present method and system do not need to collect substantial amounts of training data to train or retrain a model to adapt the model to the presence of the new IoT device. Accordingly, scaling of the present method and system, even in terms of adding new devices, is very straightforward.

Figure 2E:
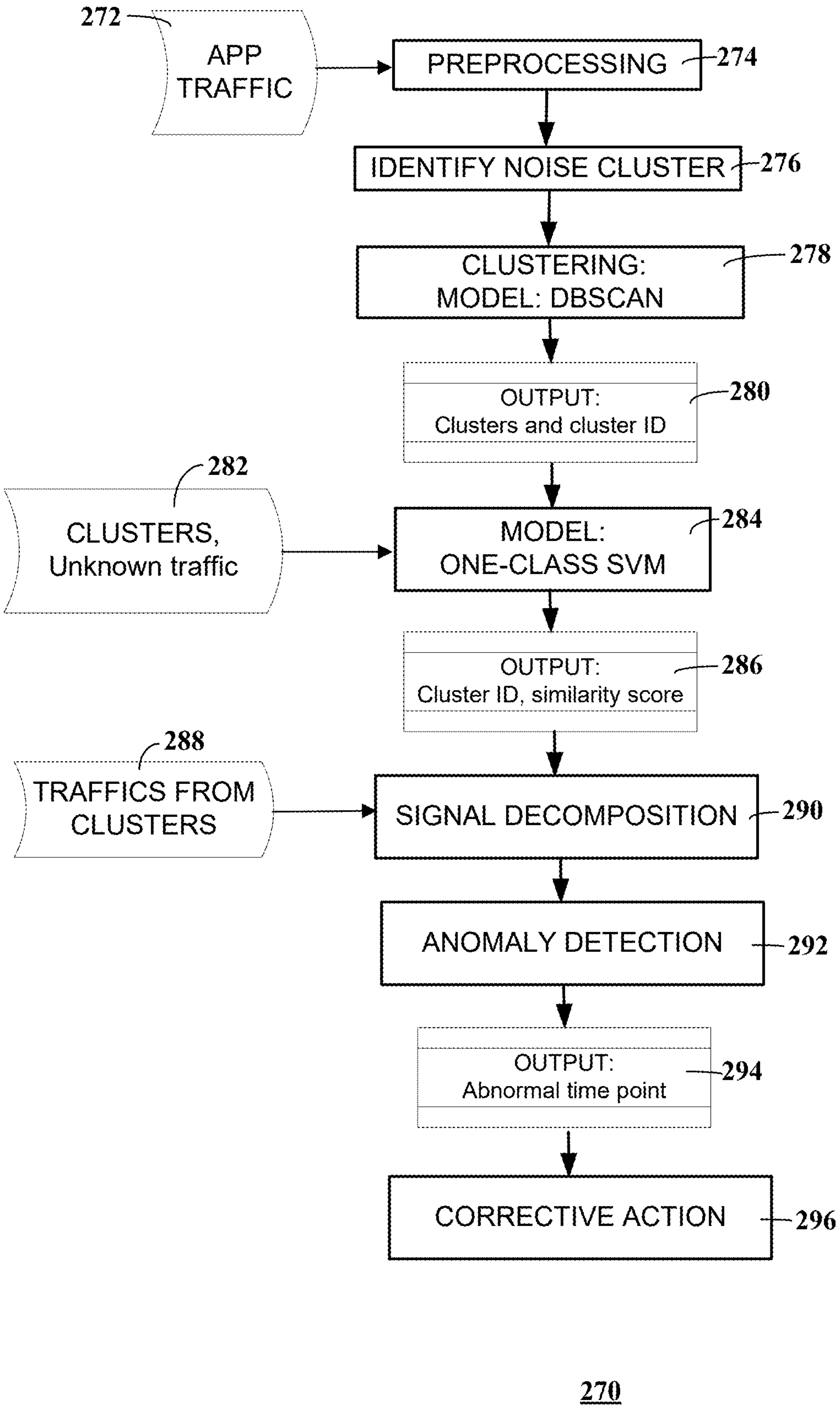
FIG. 2E depicts an illustrative embodiment of a method in accordance with various aspects described herein.

FIG. 2E depicts an illustrative embodiment of a method 270 in accordance with various aspects described herein. The method 270 may be used for clustering traffic and detecting anomalies in telecommunication networks, IoT devices, and connected cars, for example. The method 270 may be performed at any suitable device such as at a server computer of a core network of a cellular network that couples IoT devices and connected vehicles with service providers who process data from the devices and vehicles. The method may generally run all the time, processing incoming traffic, identifying anomalies in the data and taking corrective actions.

The method 270 begins at step 272 with receipt of application traffic. In the example embodiment, the application traffic is received from a group of IoT devices and communicated over a cellular network. The cellular network receives the application traffic, processes the traffic, and conveys it to a certain service provider. The application traffic may include traffic generated by the IoT device operating according to a particular application on the IoT device. In response to the application, the IoT device generates data which is conveyed as application data or application traffic to the cellular network.

At step 274, the application traffic is preprocessed. Preprocessing may include removing out of range values, filling in missing values, normalization of data, and any other suitable data smoothing operations. At step 276, noise clusters in the received application traffic data may be removed. Certain data flows of application may display random spikes instead of clear patterns. Such noise spikes are typically caused by only a very few devices. These flows provide limited information. Accordingly, data received with these are commonly grouped into a noise cluster to prevent their misclassification into meaningful clusters. Removing these noise clusters in step 276 results in cleaner data.

At step 278, clustering is applied to the application data received from the IoT devices. In exemplary embodiments, the DBSCAN machine learning model is used to cluster the data period. Any other suitable clustering technique may be used. In embodiments, because some implementations of DBSCAN are not well adapted to time series data with temporal structures, such as the application data from the IoT devices, a statistical approach such as the Matrix Profile method maybe used to better adapt the application data for processing by DBSCAN or another algorithm.

At step 280, the clustering process produces as output a set of clusters, each identified by a cluster identifier. Each cluster includes data for a group of IoT devices that are determined by the clustering process to be similar or to have similar characteristics. The data includes time series data for each of the respective devices. The data may also include, in addition to the application data, communication data, such as uplink volume and downlink volume for communication by the respective devices on a communication network such as the cellular network.

At step 282, inputs are received by the method 270. The inputs in the example, include unknown traffic received at the cellular network and a set of clusters. In the example, the set of clusters produced as outputs at step 280 may be retrieved for further processing. The unknown traffic may include application traffic and network communication traffic associated with one or more IoT devices. The one or more IoT devices may be unknown and unrecognized, qualifying this traffic as unknown traffic. For example, the unknown traffic could originate with an IoT device which itself is not previously known to the network. Alternatively, the unknown traffic could originate with a new type of device that is not previously known. Because the traffic is unknown, and may creative security risk such as malware in the network, the unknown traffic may be analyzed to identify anomalies that might suggest a security risk. Accordingly, the unknown traffic is processed along with the clusters also received as input at step 282.

At step 284, a correlation analysis is performed on the unknown traffic using spatial distance to determine the closest cluster. In the example embodiment, a one-class support vector machine (SVM) may evaluate the similarity between the unknown traffic and the clusters received as input at step 282. The SVM may estimate the boundaries of the clusters and providing a similarity score. The similarity score may serve as an indication of how similar the unknown traffic is to a cluster that is selected to be closest to the unknown traffic, based on the similarity score. Add step 286, the method 270 produces as output a cluster identifier corresponding to the cluster determined to be the closest to the unknown traffic and the similarity score.

At step 288, the method 270 receives as an input data or information about traffic stored in the cluster determined at step 284 to be the closest to the unknown traffic. The information about the traffic includes all time series data for a set of IoT devices that are gathered together in the cluster based on similar characteristics of the IoT devices and traffic from the IoT devices.

At step 290, each traffic time series within a cluster is decomposed into three components, including trend, period, and noise. Any suitable decomposition process may be used. The trend and period components are then used to reconstruct the traffic flow. In particular, a center line or baseline is determined for the reconstructed data. In an example, a particular IoT having traffic data closest to the average of all the traffic data for the cluster may be selected, and the time series traffic data for the selected IoT device may be set as the baseline.

At step 292, anomalies in the data are detected. In embodiments, statistics for the cluster data, such as a range of plus or minus six standard deviations, may be used to define the range of valid data in the reconstructed signal. Any data points outside this range of valid data points may be considered an anomaly. The existence as an anomaly indicates that a data point, and an IoT device, may warrant further investigation. Accordingly, at step 294, the method 270 outputs a time point corresponding to a time when the anomaly is detected to have occurred and fallen outside the acceptable range of data values. The time information may be used to identify and locate the IoT device responsible for the anomaly.

At step 296, some corrective action may be taken in order to limit or prevent a security failure related to the anomaly. For example, the IoT device associated with the anomaly may be located and tested for compliance. If the device is not compliant with security standards, the device may be taken offline and removed from service. In other examples, the device may be identified and designated for removal. Moreover, the device may be indicated as "do not respond," and the data from the device may no longer be monitored. Any suitable steps to disable or disengage or remove the device, or isolate the device to prevent any security break maybe followed.

The system and method in accordance with the various aspects described herein offer a comprehensive approach for clustering traffic and detecting malware anomalies by leveraging state-of-the-art analytics, machine learning algorithms, and artificial intelligence techniques. The method and system combine the analysis of packet flow, User Equipment (UE) data, and malware knowledge, addressing the challenges associated with large-scale telecommunication networks, IoT devices, and connected car networks, and ensuring the reliability, accuracy, and security of the network.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
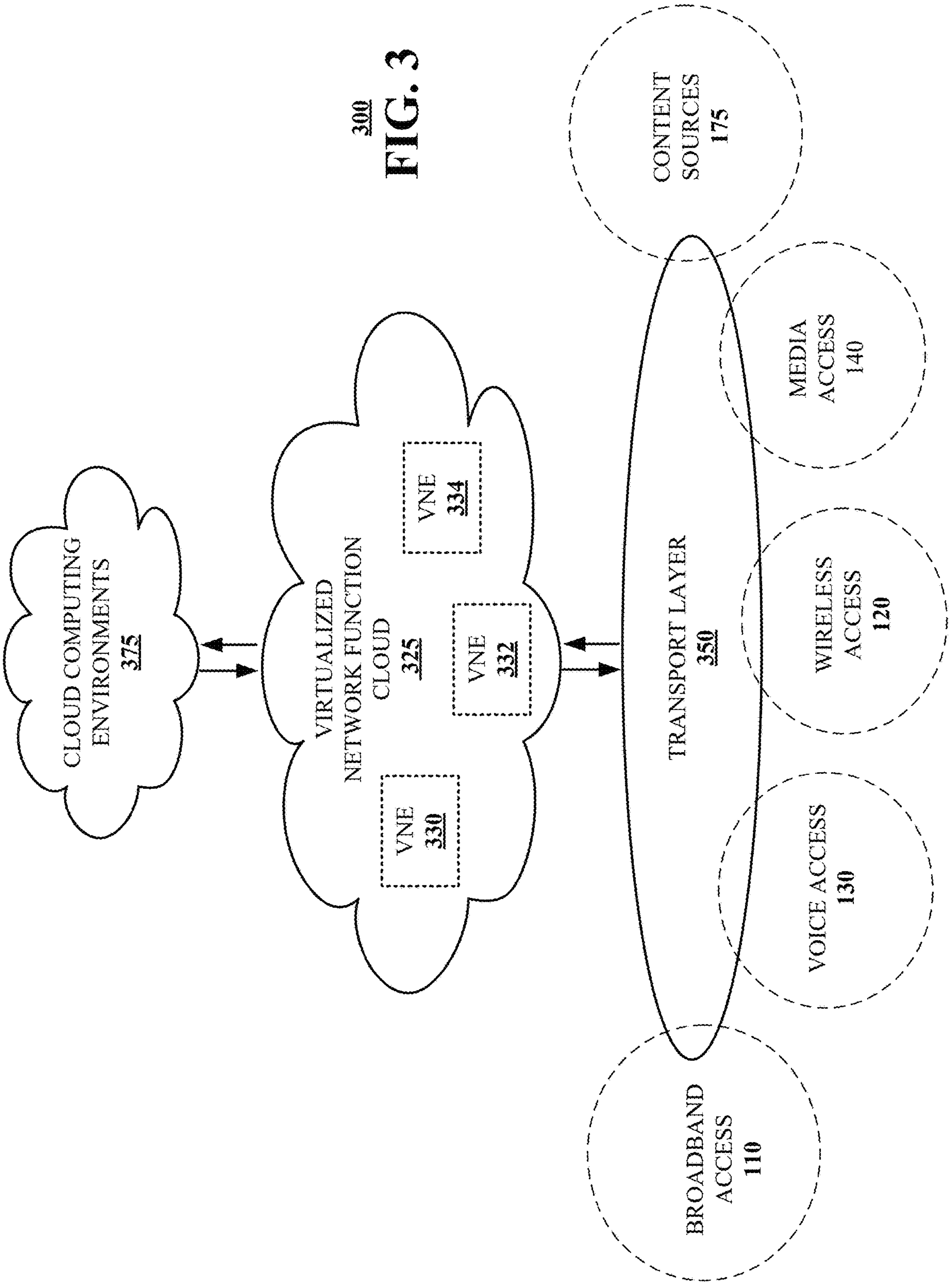
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200, and method 270 presented in FIG. 1, FIG. 2A, FIG. 2B, FIG. 2C, FIG. 2D, FIG. 2E and FIG. 3. For example, virtualized communication network 300 can facilitate in whole or in part receiving data over a network from devices operating in the network, clustering the data for classifying further data, receiving unknown data and comparing the unknown data with data clusters to identify data anomalies, and taking corrective action based on the data anomalies to prevent security breaches in the network.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
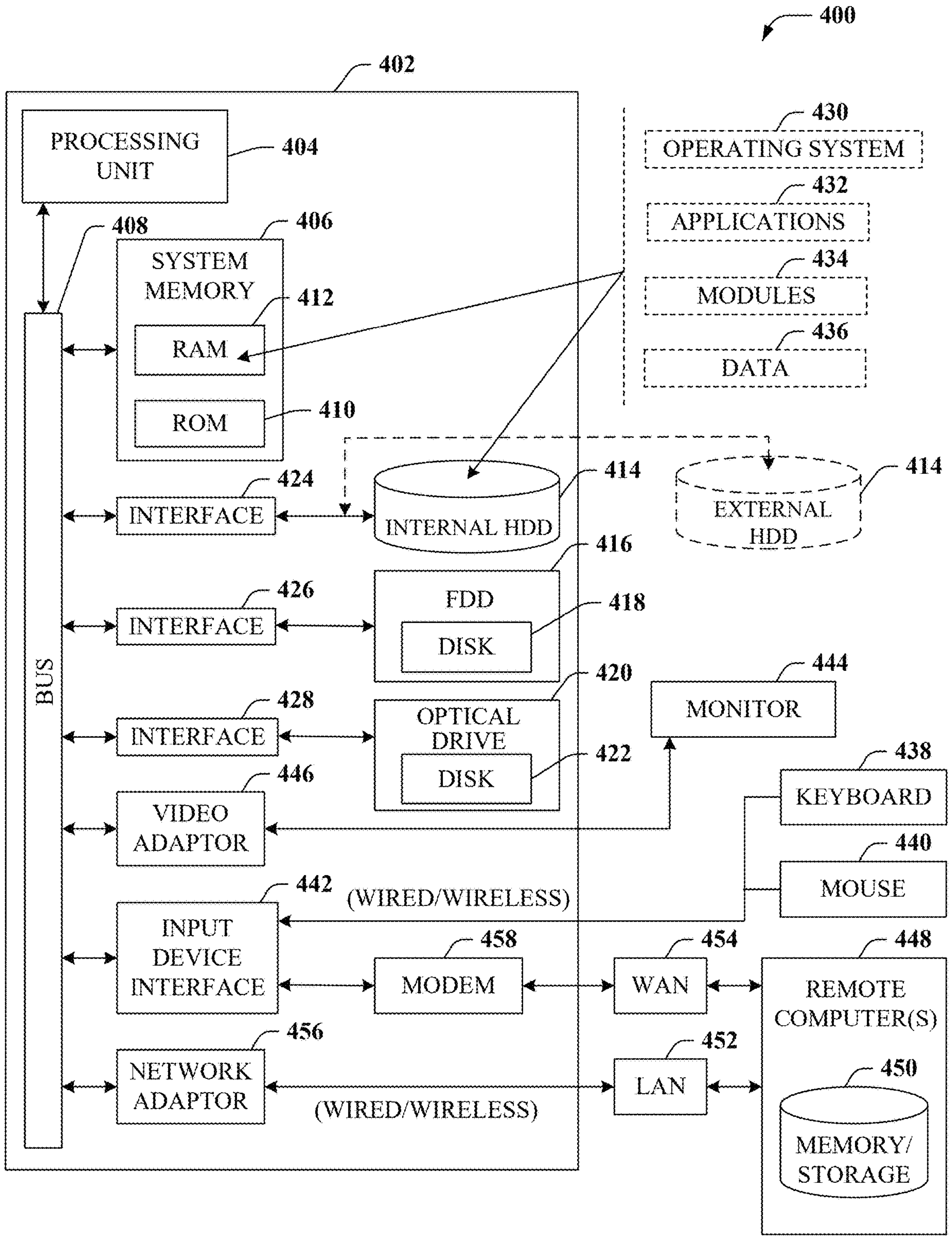
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part receiving data over a network from devices operating in the network, clustering the data for classifying further data, receiving unknown data and comparing the unknown data with data clusters to identify data anomalies, and taking corrective action based on the data anomalies to prevent security breaches in the network.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can also be connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are examples and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
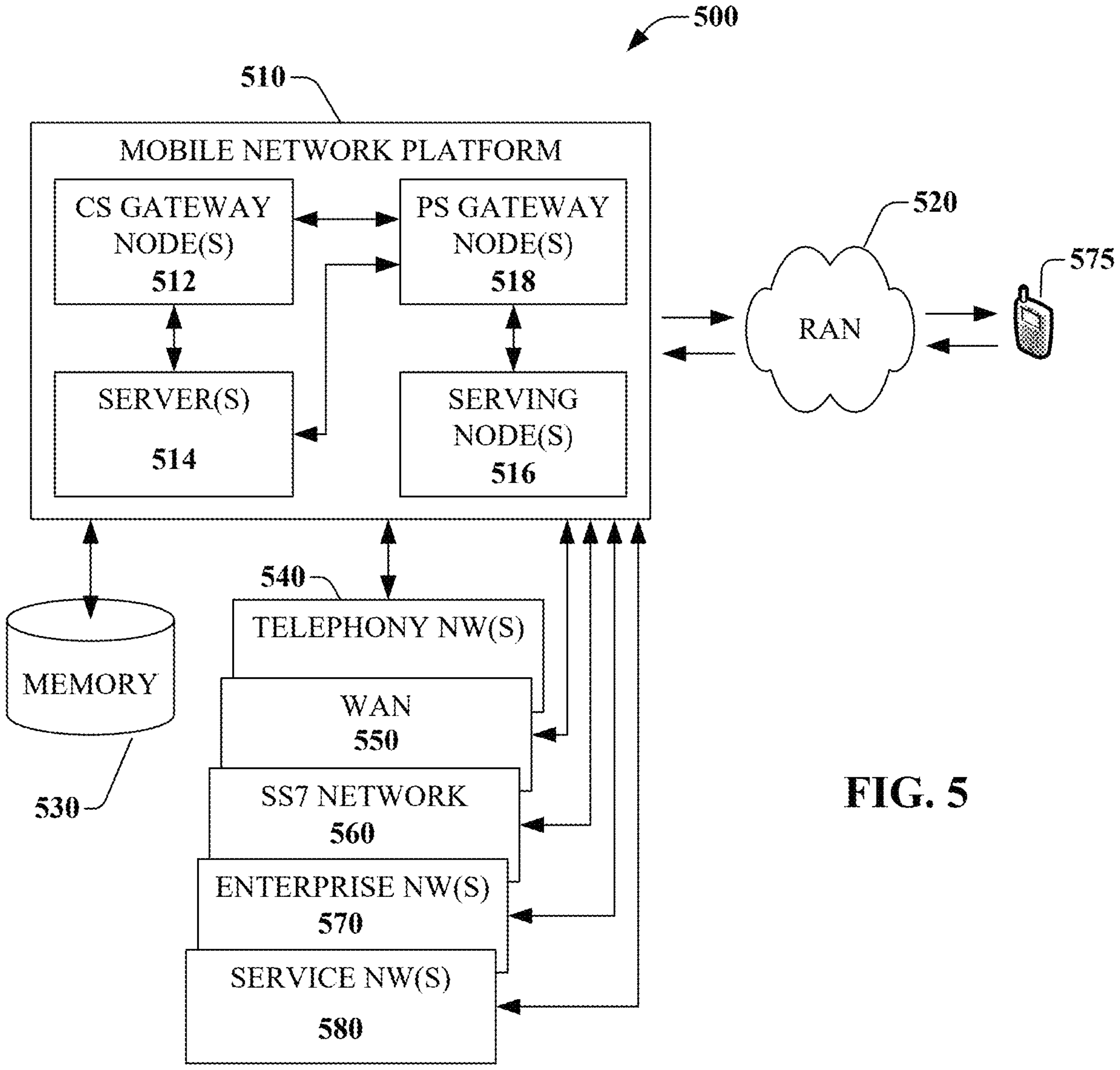
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part receiving data at the mobile network platform 510 over a network from devices operating in the network, clustering the data for classifying further data, receiving unknown data and comparing the unknown data with data clusters to identify data anomalies, and taking corrective action based on the data anomalies to prevent security breaches in the network. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway nodes 518, and serving node(s) 516, is provided and dictated by radio technologies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
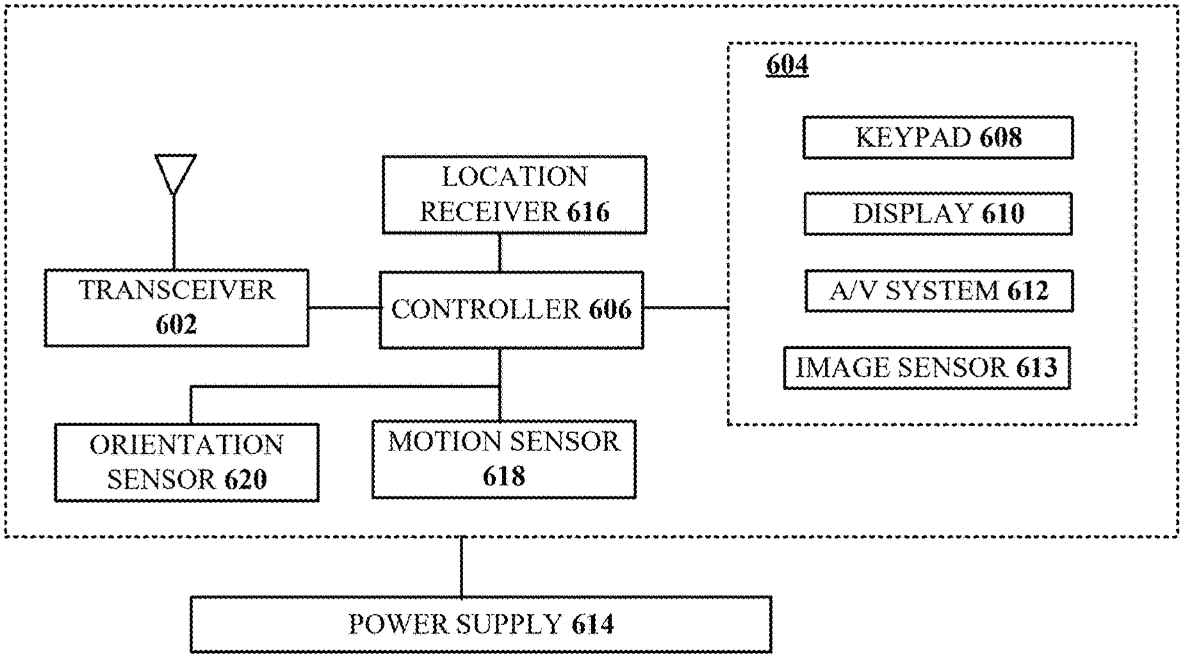
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part receiving data over a network from devices such as the communication device 600 operating in the network, clustering the data for classifying further data, receiving unknown data and comparing the unknown data with data clusters to identify data anomalies, and taking corrective action based on the data anomalies to prevent security breaches in the network.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving communication traffic from one or more Internet of Things (IoT) devices, the communication traffic comprising time series data;

clustering the communication traffic, wherein the clustering the communication traffic comprises identifying an assigned cluster to which the communication traffic should be assigned and determining a similarity between the communication traffic and the assigned cluster, and wherein the clustering the communication traffic further comprises:

identifying noise data flows and grouping the noise data flows in a noise cluster;

removing the noise cluster from further evaluation;

applying a machine learning clustering process to the communication traffic to identify common characteristics in the communication traffic; and grouping a set of IoT devices based on the common characteristics of IoT devices of the set of IoT devices;

decomposing the time series data of the communication traffic within the assigned cluster, forming decomposed time series;

determining a baseline of the assigned cluster after removing noise from the decomposed time series, forming a reconstructed traffic signal;

detecting an anomaly in the reconstructed traffic signal, wherein the detecting the anomaly is based on a variation of a data flow value of an anomalous IoT device from the baseline of the assigned cluster; and identifying the anomalous IoT device.

2. The device of claim 1, wherein the receiving communication traffic from the one or more IoT devices comprises:

receiving application traffic from an application operating on the one or more IoT devices;

analyzing the application traffic; and conveying the application traffic to a service provider associated with the one or more IoT devices.

3. The device of claim 2, wherein the receiving the communication traffic from the one or more IoT devices comprises:

receiving the communication traffic at a cellular communication network.

4. The device of claim 2, wherein the identifying the anomalous IoT device comprises:

identifying the anomalous IoT device to the service provider.

5. The device of claim 4, wherein the operations further comprise:

disabling the anomalous IoT device.

6. The device of claim 4, wherein the operations further comprise:

ignoring future communication traffic from the anomalous IoT device.

7. The device of claim 1, wherein the operations further comprise:

decomposing the time series data of the communication traffic within the assigned cluster into trend data, period data and the noise; and forming the reconstructed traffic signal based on the trend data and the period data.

8. The device of claim 1, wherein the determining the similarity between the communication traffic and the assigned cluster comprises:

receiving unknown traffic in the communication traffic, the unknown traffic having limited identification information and being potentially malicious; and determining a closest cluster, among a set of clusters, to which the unknown traffic should be assigned.

9. The device of claim 1, wherein the operations further comprise:

determining a range around the baseline of the assigned cluster, wherein the range is based on a statistical variation in data of the baseline; and identifying the anomaly based on the variation of the data from a value of the anomalous IoT device to a value outside the range around the baseline of the assigned cluster.

10. The device of claim 1, wherein the operations further comprise:

receiving additional communication traffic from new IoT devices;

identifying a new cluster based on the additional communication traffic;

receiving unknown traffic; and associating the unknown traffic with an existing cluster or the new cluster based on common characteristics in the communication traffic.

11. A non-transitory machine-readable medium, comprising executable instructions that, when executed by a processing system including a processor, facilitate performance of operations, the operations comprising:

receiving unknown communication traffic in a radio communication network;

identifying a closest cluster among a plurality of clusters, the plurality of clusters corresponding to traffic patterns in the radio communication network, wherein traffic patterns in a respective cluster share common traffic characteristics, the closest cluster having a smallest spatial distance from the unknown communication traffic;

adding the unknown communication traffic to the closest cluster;

decomposing all communication traffic in the closest cluster, forming a decomposed time series;

removing noise from the decomposed time series;

reconstructing a baseline of the closest cluster based on trend information and period information of the decomposed time series, forming a reconstructed cluster;

comparing values of the unknown communication traffic with a range of values for the reconstructed cluster to identify an anomaly in the unknown communication traffic; and identifying a device or an application operating on the device associated with the anomaly.

12. The non-transitory machine-readable medium of claim 11, wherein the operations further comprise:

receiving communication traffic from one or more Internet of Things (IoT) devices, the communication traffic comprising time series data associated with communicating the communication traffic or associated with an application operating an IoT device of the one or more IoT devices;

clustering the communication traffic, wherein the clustering comprises identifying an assigned cluster to which the communication traffic should be assigned and determining a similarity between the communication traffic and the assigned cluster; and assigning a respective IoT device, and respective time series data associated with the respective IoT device, to the assigned cluster.

13. The non-transitory machine-readable medium of claim 12, wherein the clustering the communication traffic comprises:

identifying subsequences in the time series data to determine distance measures in the communication traffic; and providing the distance measures to a machine learning process to identify devices to be clustered together in a particular cluster based on similar data in the communication traffic, wherein the particular cluster may comprise a plurality of subclusters.

14. The non-transitory machine-readable medium of claim 11, wherein the operations further comprise:

locating the device or the application operating on the device associated with the anomaly;

identifying the device or the application as creating a security issue for a service provider associated with the device or the application; and disabling the device to eliminate the security issue.

15. A method, comprising:

receiving, by a processing system including a processor, application traffic from a plurality of Internet of Things (IoT) devices processing an application, wherein the receiving the application traffic comprises receiving the application traffic over a mobile communication network;

clustering, by the processing system, the application traffic to identify clusters of similar IoT devices based on common characteristics of the application traffic from the plurality of IoT devices;

receiving, by the processing system, unknown traffic over the mobile communication network;

determining, by the processing system, a closest cluster, the closest cluster being determined based on similarities between the unknown traffic and respective clusters of the clusters of IoT devices;

decomposing, by the processing system, traffic signals of the closest cluster into trend information, period information and noise information, forming decomposed traffic;

reconstructing, by the processing system, the decomposed traffic into reconstructed traffic, wherein the reconstructing is based on the trend information and the period information to remove noise information from the traffic signals of the closest cluster, forming a baseline for the closest cluster;

detecting, by the processing system, an anomaly in the reconstructed traffic, wherein the detecting the anomaly is based on a variation in data of the reconstructed traffic from data of the baseline for the closest cluster exceeding a statistical threshold; and initiating, by the processing system, a corrective action to limit a security threat, wherein the corrective action is based on the anomaly in the reconstructed traffic.

16. The method of claim 15, wherein the receiving the unknown traffic comprises:

receiving, by the processing system, traffic from a previously unknown IoT device; or receiving, by the processing system, application traffic from a previously unknown application, wherein the previously unknown IoT device and the previously unknown application comprise a potential security threat.

17. The method of claim 16, wherein initiating the corrective action to limit the security threat comprises:

initiating, by the processing system, a disabling of the previously unknown IoT device.

18. The method of claim 15, wherein the clustering the application traffic comprises:

providing, by the processing system, time series data associated with communication of the application traffic over the mobile communication network to a machine learning process; and receiving, by the processing system, cluster data for a plurality of device clusters, each device cluster including respective time series data associated with respective IoT devices which are determined to be similar IoT devices based on the respective time series data.

19. The method of claim 18, further comprising:

receiving, by the processing system, a time series of statistics including downlink data volume information and uplink data volume information for the communication of the application traffic over the mobile communication network between a base station of the mobile communication network and an IoT device of the plurality of IoT devices.

20. The device of claim 1, wherein the machine learning clustering process comprises a density-based spatial clustering of applications with noise (DBSCAN) process.

* * * * *